(12) United States Patent
Ciak et al.

(10) Patent No.: US 7,481,320 B2
(45) Date of Patent: Jan. 27, 2009

(54) FILTER DEVICE HAVING A BI-DIRECTIONAL VALVE

(75) Inventors: Kirk J. Ciak, Troy, MI (US); Wilhelmus Petrus Maria Schaerlaeckens, Bavel (NL)

(73) Assignee: NTZ Nederland BV, Rotterdam (NL)

( * ) Notice: Subject to any disclaimer, the term of this patent is extended or adjusted under 35 U.S.C. 154(b) by 0 days.

(21) Appl. No.: 10/905,459

(22) Filed: Jan. 5, 2005

(65) Prior Publication Data
US 2005/0145558 A1   Jul. 7, 2005

Related U.S. Application Data

(60) Provisional application No. 60/534,352, filed on Jan. 5, 2004.

(51) Int. Cl.
*B01D 35/147* (2006.01)
*B01D 35/15* (2006.01)
*B01D 35/00* (2006.01)

(52) U.S. Cl. .................. 210/424; 210/429; 210/430; 210/130; 137/493.1; 137/493.6; 137/493.9; 137/493

(58) Field of Classification Search .......... 210/131, 210/132, 359, 398, 420, 424, 425, 426, 429, 210/430, 433.1, 236, 130; 137/493.6, 493.1, 137/493.9, 513.3, 513.5, 513.7
See application file for complete search history.

(56) References Cited

U.S. PATENT DOCUMENTS

| | | | | | |
|---|---|---|---|---|---|
| 3,165,467 | A | * | 1/1965 | Klein et al. | 210/130 |
| 3,472,380 | A | * | 10/1969 | Rosaen | 210/90 |
| 3,625,248 | A | * | 12/1971 | Lhotellier | 137/493.6 |
| 3,799,347 | A | * | 3/1974 | McDuffie | 210/134 |
| 2003/0010725 | A1 | * | 1/2003 | Druga | 210/767 |

* cited by examiner

*Primary Examiner*—Krishnan S. Menon
*Assistant Examiner*—Benjamin Kurtz
(74) *Attorney, Agent, or Firm*—John A. Artz; Dickinson Wright PLLC

(57) ABSTRACT

One advantageous embodiment of the invention is a filter device (10) for filtering a fluid and providing three or more substantially continuous directions of flow therethrough. The filter device (10) includes a housing (12) having an entry port (18) and an exit port (20). The housing (12) has a filter medium (22) disposed therein for filtering the fluid that flows along a filtration-flow direction (24a) from the entry port (18) to the exit port (20). The filter medium (22) has a bi-directional valve (28) coupled thereto for selectively directing the fluid along a bypass-flow direction (24b) and a reverse-flow direction (24c) that is generally opposite to said bypass-flow direction (24b). The bypass-flow direction (24b) extends from the entry port (18) to the exit port (20) in bypass of the filter medium (22). Also, the reverse-flow direction (24c) extends from the exit port (20) to the entry port (18).

19 Claims, 7 Drawing Sheets

FILTER DEVICE HAVING A BI-DIRECTIONAL VALVE

CROSS-REFERENCE TO RELATED APPLICATIONS

This application claims the benefit of U.S. Provisional Application No. 60/534,352, entitled "A FILTER DEVICE HAVING A BI-DIRECTIONAL VALVE" which was filed on Jan. 5, 2004.

TECHNICAL FIELD

The present invention relates generally to filter devices, and more particularly to a filter device having a filter medium and a bi-directional valve for directing the fluid through the filter device when the filter medium is substantially obstructed or when the filter device is improperly installed.

BACKGROUND

Current inline filter devices for transmissions typically incorporate single-mode bypass valves. A typical bypass valve is utilized for bypassing the filter medium and directing automatic transmission fluid (ATF) through the filter housing when the filter medium becomes clogged or otherwise substantially obstructed. This feature is beneficial for providing a continuous, uninterrupted flow of ATF to the automatic transmission system. For this reason, it is understood that the single-mode bypass valve can prevent damage to the automatic transmission system.

The typical filter housing lacks any markings, which indicate the direction by which ATF is intended to pass through the filter device and thus the orientation of the filter device during installation. For that reason, the typical filter device can be improperly installed such that ATF enters the fluid device through the outlet port instead of the inlet port. In that instance, the single-mode bypass valve typically does not have a sufficient construction for directing ATF through the filter device. As a result, the automatic transmission system may not receive ATF and therefore be damaged.

Some manufacturers have produced housings with marking for indicating the proper flow through the filter device. However, despite these markings, the ATF hoses and the automatic transmission system, which are coupled to the filter device, may not readily indicate the direction in which the ATF flows in the system. In that regard, the markings may not by themselves indicate how to properly install the filter device. For this reason, the filter device can be improperly installed and the automatic transmission components can be substantially damaged.

Therefore, a need exists for a filter device having a bi-directional valve for directing fluid through the filter device when the filter medium has become clogged and also when the filter medium is improperly installed.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

The present invention provides a filter device having a filter medium and a bi-directional valve for bypassing the filter medium in two or more directions of flow. The bi-directional valve directs the fluid through the filter device when the filter medium becomes clogged or otherwise substantially obstructed. In addition, the bi-directional valve also directs the fluid through the filter device when the device is installed in an improper orientation such that the fluid flows through the filter device in an unintended direction. In this regard, the filter device supplies fluid to a system coupled thereto when the filter device in various orientations and when the filter medium is occluded. In that regard, the bi-directional valve can increase the life of the automatic transmission system.

Figure 1:
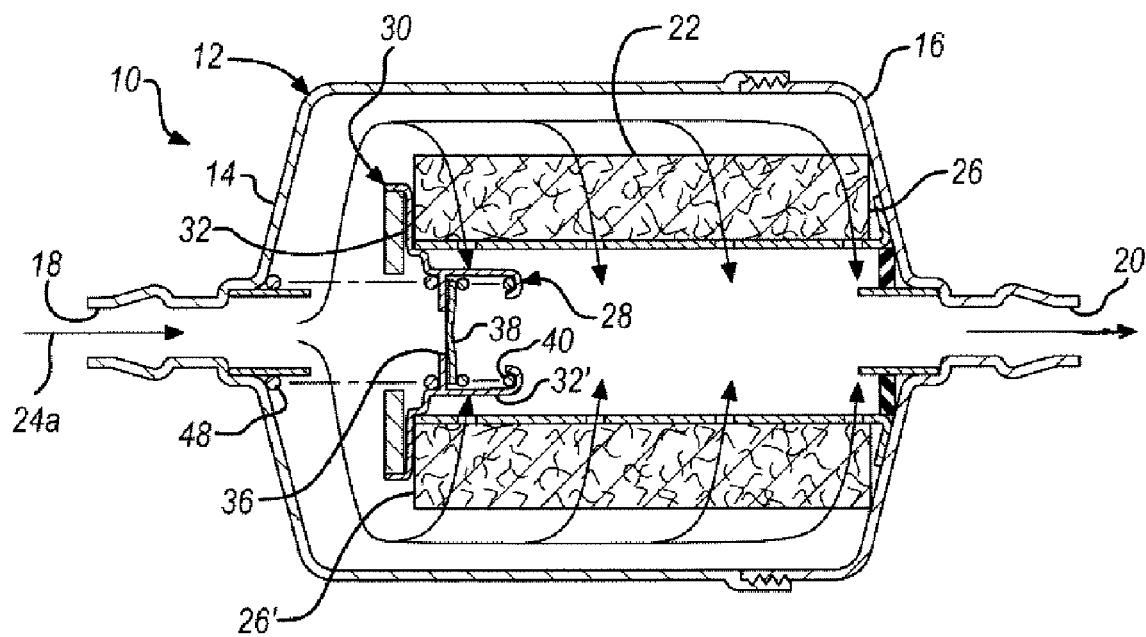
FIG. 1 is a cross-sectional view of a filter device having a bi-directional valve, illustrating the proper installation of the filter device in an ATF line and the filtration of fluid passing through the filter device, according to one advantageous embodiment of the claimed invention.
Figure 2A:
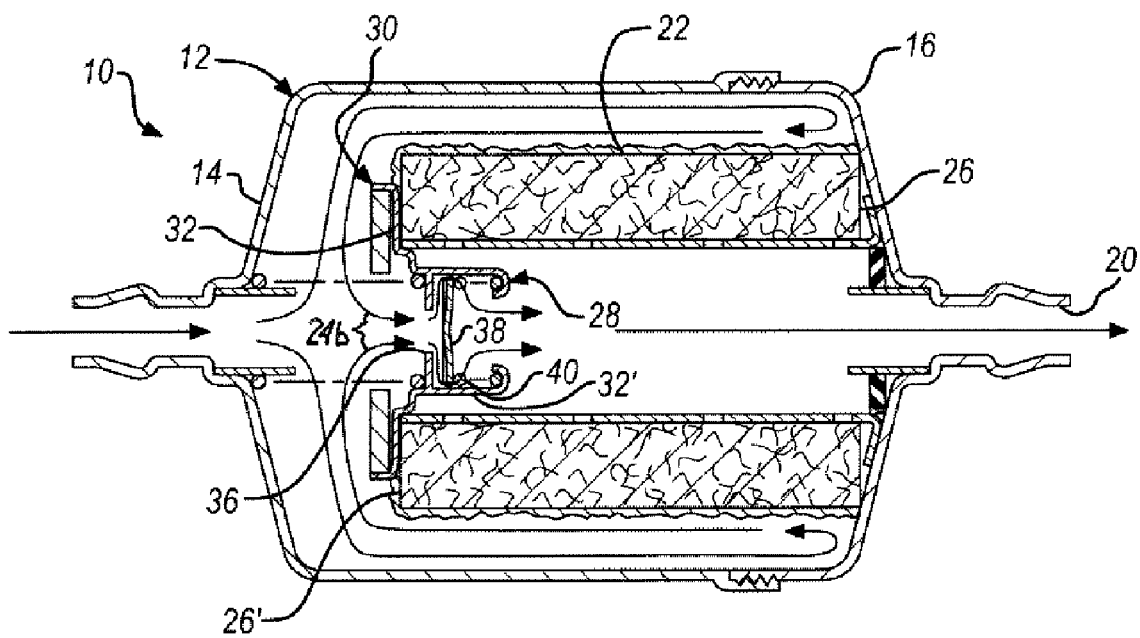
FIG. 2A is a cross-sectional view of the filter device shown in FIG. 1, illustrating the bi-directional valve directing fluid through the filter device in bypass of a clogged filter medium.
Figure 2B:
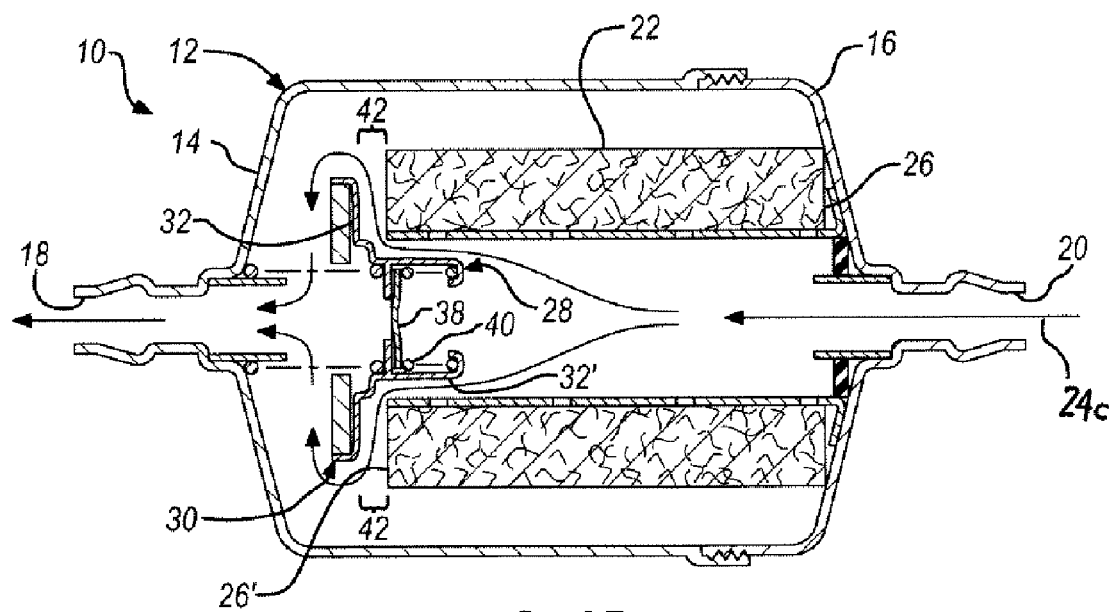
FIG. 2B is a cross-sectional view of the filter device shown in FIG. 1, illustrating the improper installation of the filter device and the bi-directional valve directing fluid through the filter device.

FIGS. 1, 2A, and 2B illustrate an in-line filter device 10 according to one advantageous embodiment of the invention.

This filter device 10 includes a housing 12 with opposing end portions, namely a cup body 14 and a cap portion 16 threadably engaged to the cup body 14. In this embodiment, the cap portion 16 includes a cap port 20, and the cup body 14 includes a cup port 18. According to this invention, the cup port 18 is an inlet for the fluid when the cap port is an outlet for the fluid. Moreover, the cup port 18 is an outlet for the fluid when the cap port is the inlet for the fluid. However, it is understood that the housing 12 can have various other suitable constructions as desired.

In this embodiment, the filter device 10 has a bi-directional valve 28 for directing fluid along a filtration-flow direction 24a (shown in FIG. 1), a bypass-flow direction 24b (shown in FIG. 2A), and a reverse-flow direction 24c (shown in FIG. 2B).

The filter device 10 further includes a filter medium 22 contained within the housing 12. As exemplified in FIG. 1, the filtration-flow direction 24a is the normal operation of the filter device 10, which directs unfiltered fluid into the housing 12 through the cup port 18 uniformly around the periphery of the filter medium 22 and then through the filter medium 22. The filter medium 22 has a distal end portion 26, which is sealingly attached to the cap portion 16 for directing the fluid to and through the filter medium 22. Thereafter, the filtered fluid is directed through the cap port 20 and out of the filter device 10. A person of ordinary skill in the art will understand that the filter medium 22 can become clogged or otherwise substantially occluded to the extent that flow through the filter device 10 is substantially decreased or even completely blocked.

In further accordance with the invention and as shown in FIG. 2A, the filter device 10 utilizes the bi-directional valve 28 for directing the fluid along a bypass-flow direction 24b in bypass of the filter medium 22 when the filter medium 22 becomes substantially obstructed.

In this embodiment, the bi-directional valve 28 includes a mounting frame 30, which is selectively coupled to the filter medium 22. Specifically, the mounting frame 30 has an end plate portion 32 and a center tube portion 32' extending from the end plate portion 32. The center tube portion 32' has an opening 36 formed therein with a plug member 38 selectively disposed therein for blocking the bypass-flow direction 24b (shown in FIG. 2A) of fluid. The plug member 38 and the center tube portion 32' have a primary spring 40 coupled therebetween for forcing the plug member 38 into the opening 36 and blocking the bypass-flow direction 24b. The primary spring has a predetermined coefficient of stiffness for maintaining the plug member 38 in the opening 36 until a predetermined minimum fluid pressure is reached adjacent to the plug member 38. It is understood that the primary spring 40 can be various other suitable biasing members as desired.

In addition, the end plate portion 32 and the cup body 14 have a secondary spring 48 coupled therebetween for forcing the end plate portion 32 sealingly against the filter medium 22 and blocking the reverse-flow direction 24c (shown in FIG. 2B). This secondary spring has a predetermined coefficient of stiffness for blocking the reverse-flow direction of fluid up to a predetermined fluid pressure.

Figure 3:
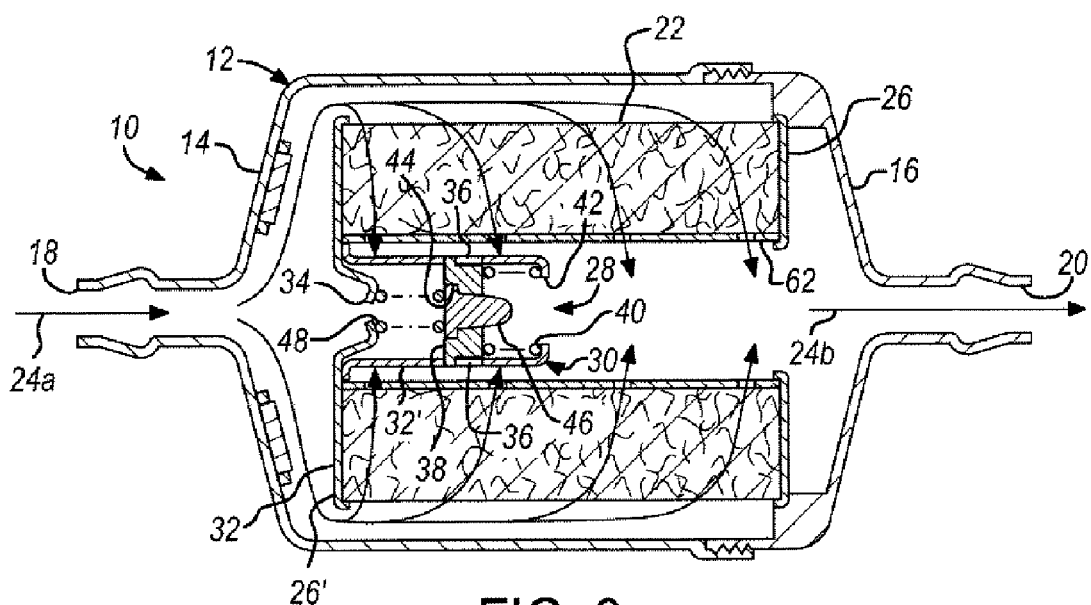
FIG. 3 is a cross-sectional view of a filter device shown in FIG. 1, according to another advantageous embodiment of the claimed invention.
Figure 4A:
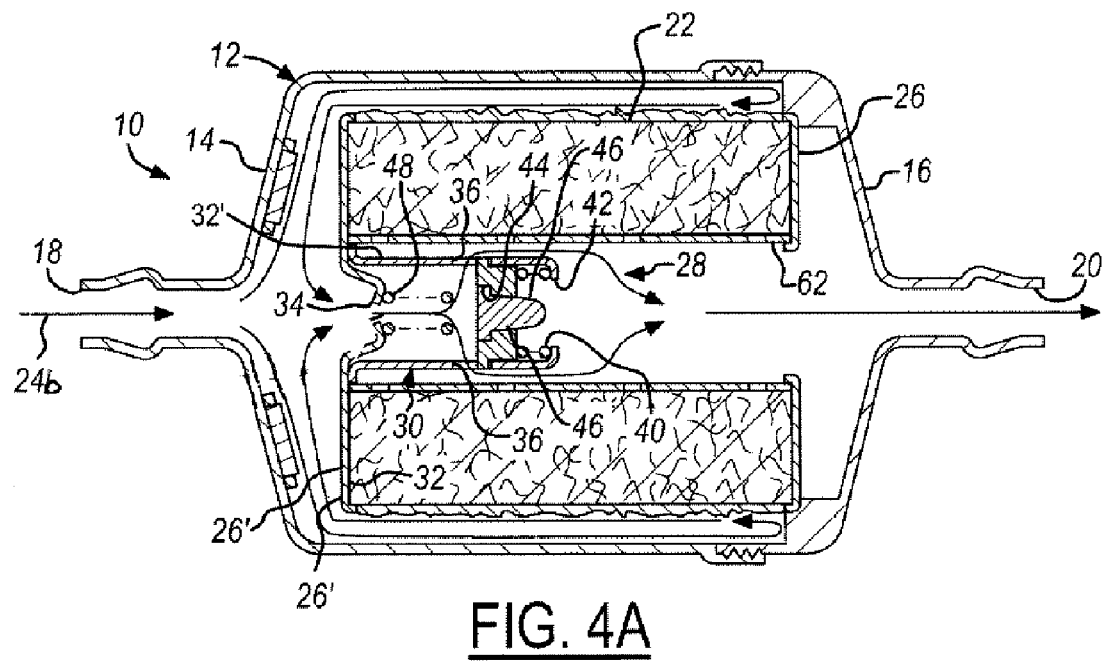
FIG. 4A is a cross-sectional view of the filter device shown in FIG. 3, illustrating the bi-directional valve directing fluid through the filter device in bypass of a clogged filter medium.
Figure 4B:
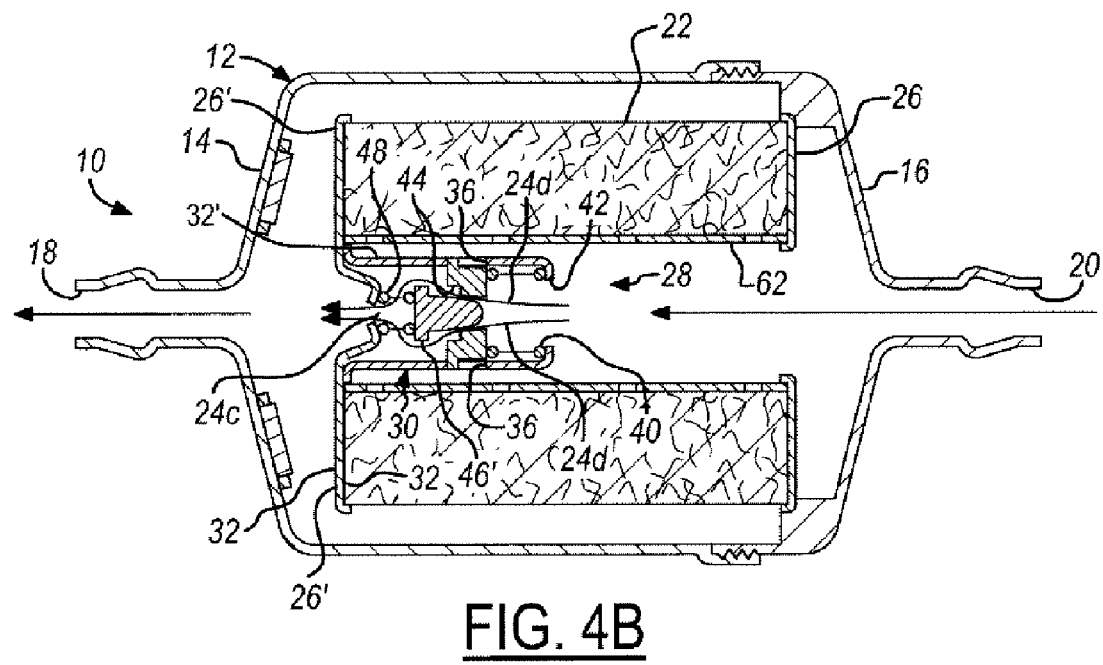
FIG. 4B is a cross-sectional view of the filter device shown in FIG. 3, illustrating the improper installation of the filter device and the bi-directional valve directing fluid through the filter device.

Referring now to FIGS. 3, 4A, and 4B, there is shown the bi-directional valve 28 according to another advantageous embodiment of the claimed invention. In this embodiment, the end plate 32 includes a primary inlet 34 for allowing fluid to enter the center tube portion 32'. This center tube portion 32' includes one or more openings 36 for allowing fluid to pass through the valve 28 and bypass the filter medium 22.

These openings 36 have the plug member 38 at least partially disposed therein for selectively blocking the bypass-flow direction of fluid through the openings 36. Specifically, as best shown in FIG. 3, the plug member 38 is operatively coupled to the primary spring 40 for biasing the plug member 38 to a sealed position, in which the plug member 38 blocks the bypass-flow direction of fluid through the openings 36. However, as shown in FIG. 4A, the fluid pressure can overcome the force of the primary spring 40 and move the plug member 38 from the sealed position to the unsealed position when sufficient fluid pressure builds up adjacent to the plug member 38, e.g. when the filter medium becomes substantially obstructed. For that reason, as indicated by arrow 24b, the fluid can flow through the openings 36 and bypass the clogged filter medium 22.

Furthermore, with reference to FIG. 4B, the filter device 10 also utilizes the bi-directional valve 28 to direct fluid along the reverse-flow direction through the device 10 when the device 10 is installed such that the fluid flows through the device 10 in an unintended direction. As explained above, the distal end portion 26 is sealingly attached to the cap portion 16. In that regard, the fluid flows through a center portion of the filter medium 22 to the bi-directional valve 28. The center tube portion 32' includes a secondary inlet 42 for allowing the fluid to enter the mounting frame 30. The plug member 38 is disposed within the mounting frame 30 and includes a hole 44 for allowing the fluid to flow through the filter device 10. This hole 44 has a stopping member 46 at least partially disposed therein for blocking the flow of fluid through the hole 44. Specifically, the stopping member 46 is operatively coupled to a secondary spring 48 for biasing the stopping member 46 in a sealed position within the hole 44 (as shown in FIG. 3). However, as indicated by arrow 24c in FIG. 4B, the fluid can overcome the force of the secondary spring 48 and move the stopping member 46 from the sealed position to the unsealed position when sufficient fluid pressure exists adjacent to the stopping member 46. For that reason, the bi-directional valve 28 preserves the flow of fluid even when the filter device is improperly installed. This feature is beneficial because the system receives a continuous supply of the fluid when the filter device 10 is installed in various orientations.

Referring now to FIGS. 5A, 5B, 6A, and 6B, there is shown the filter device 10 according to another advantageous embodiment of the invention. With particular attention to FIGS. 5A and 5B, the filter device 10 includes a sliding-filter medium 22 which can filter fluid regardless of the direction in which the fluid flows. As best shown in FIG. 7, this sliding-filter medium 22 is supported by and slidable on a series of guiding ribs 50, which extend from the cup body 14 and/or the cap portion 16. Also, two sealing gaskets 52 are coupled to opposing ends of the housing 12 for sealingly engaging end plates 32, 32' of the filter medium 22 and directing the fluid to pass through the filter medium 22. The housing 12 has two annular recesses 54 formed therein for press-fitting the gaskets 52 in those recesses 54. The recesses 54 are lathe cut within the housing 12. However, various other manufacturing processes can be utilized as desired.

Figure 8A:
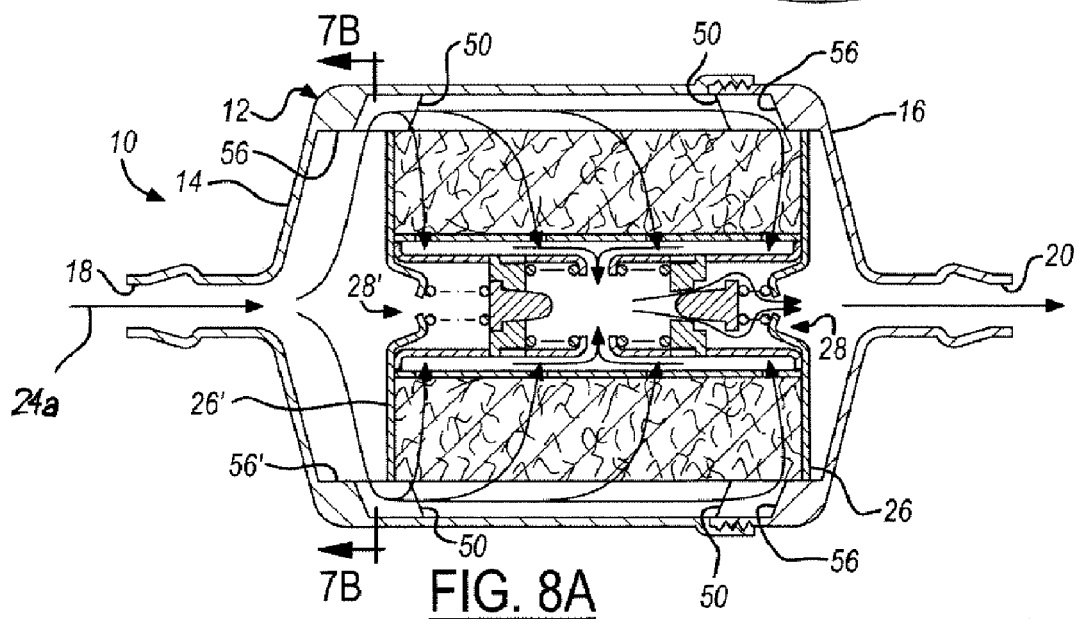
FIG. 8A is a cross-sectional view of the filter device shown in FIG. 5A, illustrating sealing members on opposing end portions of the filter housing, according to another embodiment of the invention.
Figure 8B:
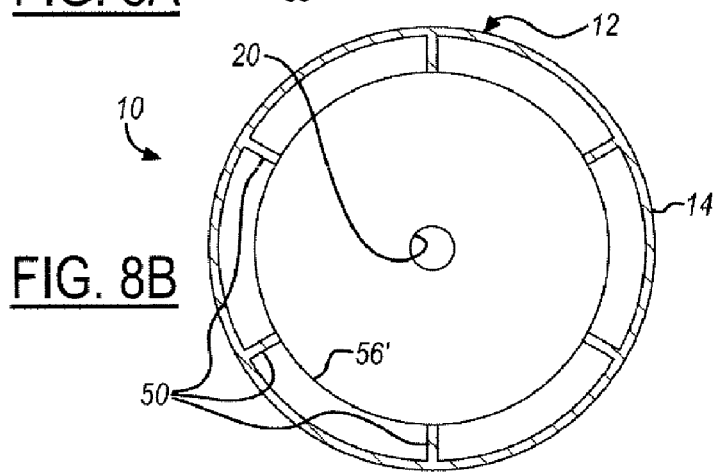
FIG. 8B is a cross-sectional view of the filter device shown in FIG. 8A, as taken along line 8B-8B.

Turning now to FIGS. 8A and 8B, there is exemplified another suitable construction of the housing 12, which enables the sliding-filter medium 22 to filter the fluid in both directions of fluid flow. In this embodiment, the housing 12 includes a series of guiding ribs 50 for axially supporting the filter medium 22. In addition, the opposing end portions of the housing have two sealing rings 56, 56' formed therein for receiving distal end portions 26, 26' of the filter medium 22. In this way, the sealing rings 56, 56' have an annular ledge construction and provide a sealing engagement between the filter medium 22 and the housing 12. In this embodiment, the respective rings 56, 56' and the guiding ribs 50 are integral parts of the cup body 14 and the cap portion 16. However, it is contemplated that various other suitable constructions can provide axial support for the sliding-filter medium 22 and sealingly engage the filter medium 22 to the housing 12. For example, in the embodiments illustrated in FIGS. 5A-6B, the sealing rings 56, 56' are the resilient sealing gaskets 52 disposed within the annular recesses 54 of the housing 12.

Referring back to FIG. 5A, a filtration-flow direction of fluid 24a enters the filter device 10 through the cup port 18 and moves the sliding-filter medium 22 so as to sealingly engage the distal end portion 26 of the filter medium 22 with the cap portion 16. For that reason, the flow of fluid is directed through the filter medium 22. Thereafter, the filtered fluid is directed through the center portion of the filter medium 22 and into a first bi-directional valve 28 similar to the one detailed in the descriptions for FIGS. 3, 4A, and 4B. The fluid can overcome the force of the secondary spring 48 and move the stopping member 46 from the sealed position to the unsealed position when sufficient fluid pressure exists adjacent to the stopping member 46. Thus, the second flow of filtered fluid can pass through the hole 44 in the plug member 38 and exit the filter device 10 through the cap port 20.

Figure 5A:
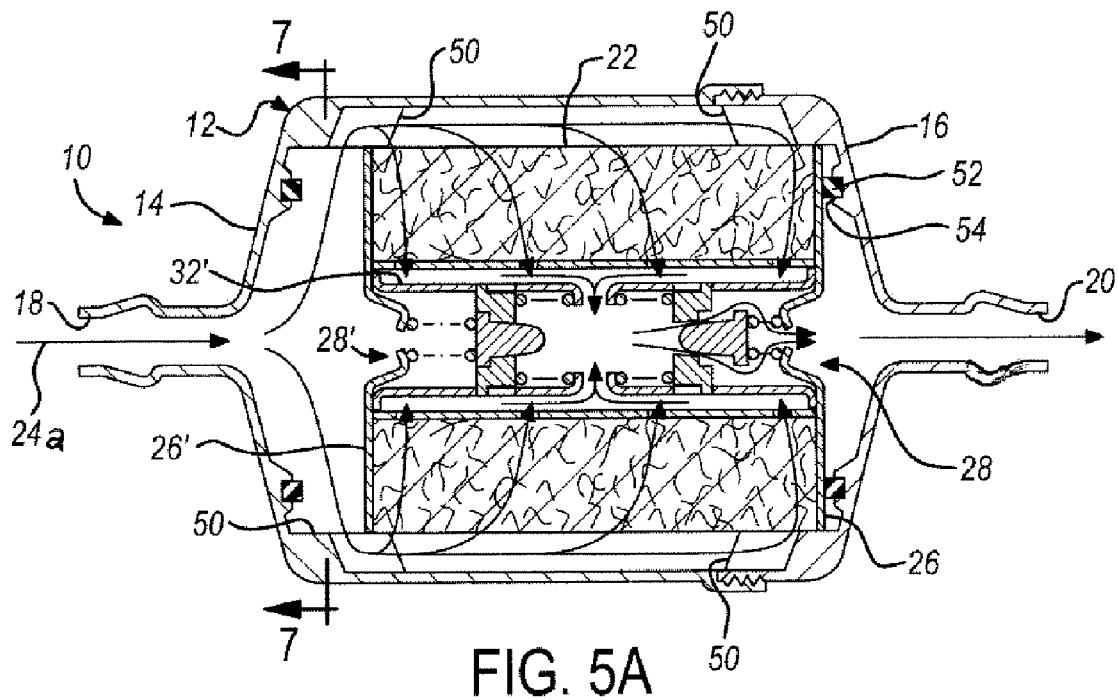
FIG. 5A is a cross-sectional view of the filter device shown in FIG. 1, illustrating a sliding-filter medium for filtering fluid that flows in a first direction, according to yet another advantageous embodiment of the invention.
Figure 5B:
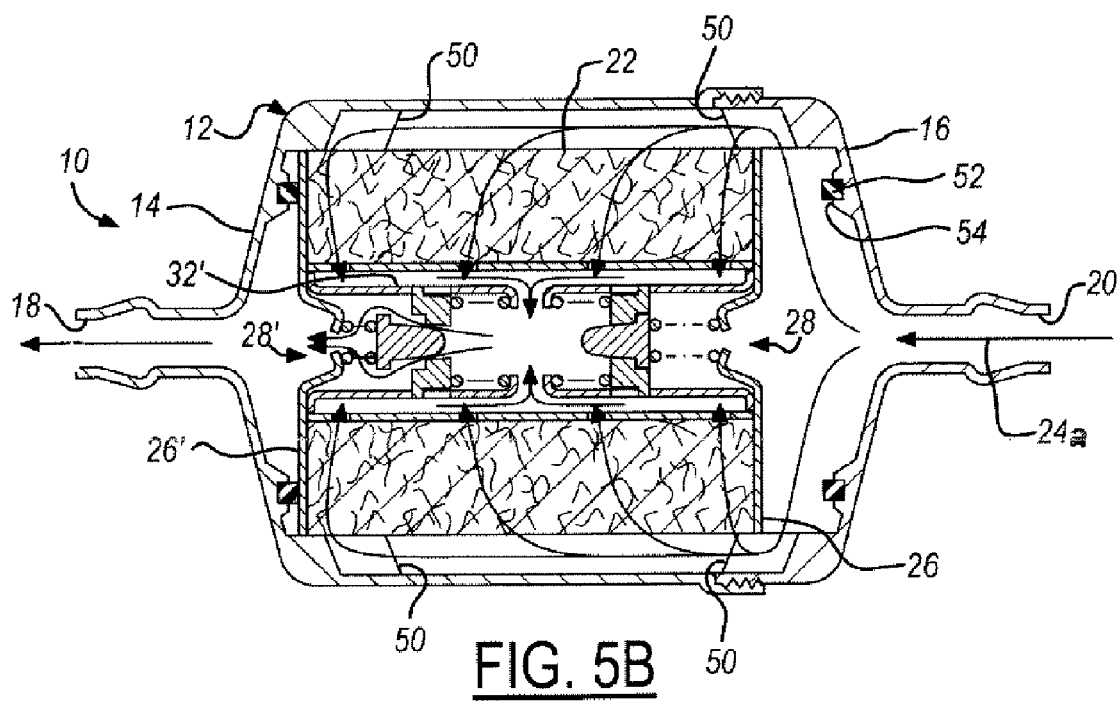
FIG. 5B is a cross-sectional view of the filter device shown in FIG. 5A, illustrating the sliding-filter medium filtering fluid that flows in a second direction opposite to the first direction.

As shown in FIG. 5B, the filter device 10 can be installed such that fluid flows through the device 10 in the opposite direction while still utilizing the sliding-filter medium 22 to filter the fluid. Similar to the construction illustrated in FIG. 5A, the filtration-flow direction of fluid enters the filter device 10 through the cap port 20 and moves the sliding-filter medium 22 so as to sealingly engage a distal end portion 26' of the filter medium 22 with the cup body 14. In that respect, the fluid is directed through the filter medium 22. Subsequently, the filtered fluid is directed through the center portion of the filter medium 22 and into a second bi-directional valve 28', which has a similar construction as the first bi-directional valve 28. The pressurized fluid can overcome the force of the secondary spring 48' and move the stopping member 46' from the sealed position to the unsealed position when sufficient fluid pressure exists adjacent to the stopping member 46'. Therefore, the filtered fluid can pass through the hole 44' in the plug member 38' and exit the filter device 10 through the cup port 18.

Figure 6A:
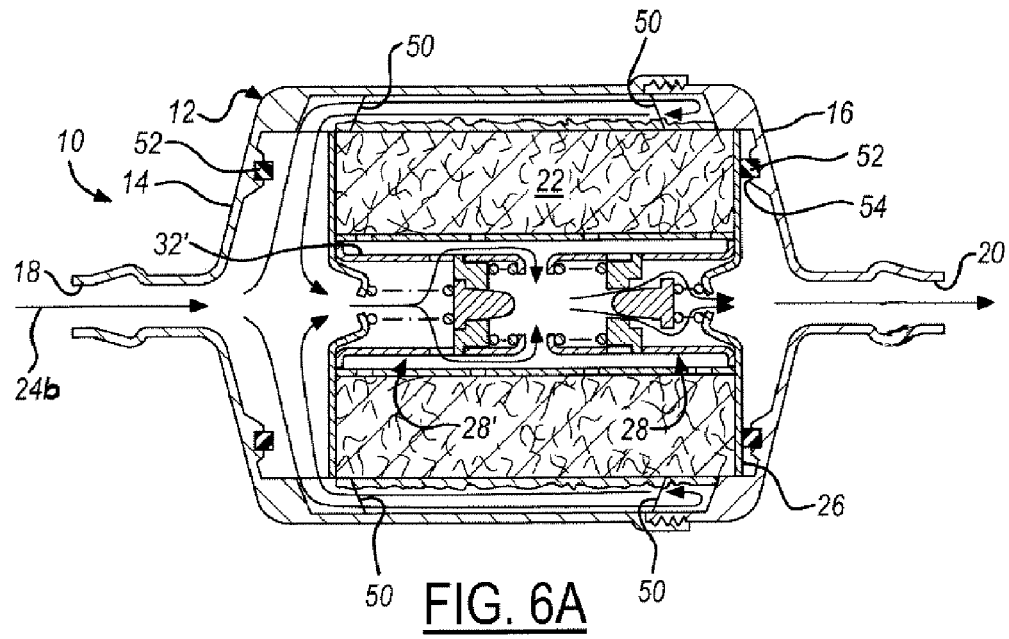
FIG. 6A is a cross-sectional view of the filter device shown in FIG. 5A, illustrating the bi-directional valves allowing fluid to bypass a clogged filter medium in the first direction of fluid flow.
Figure 7:
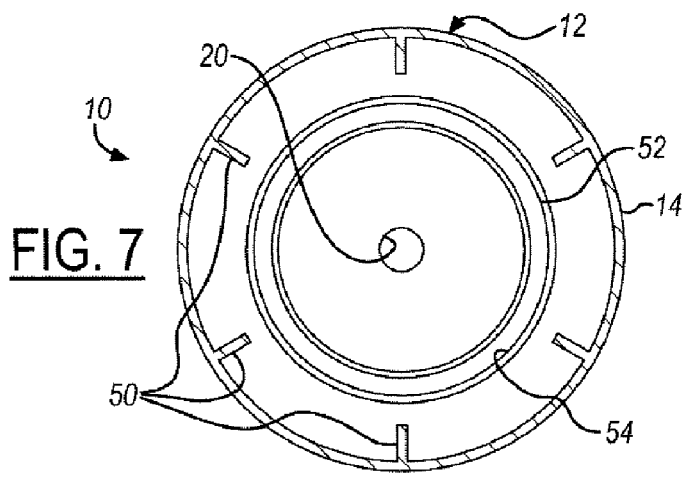
FIG. 7 is a cross-sectional view of the filter device shown in FIG. 5A, as taken along line 7-7.

Referring now to FIG. 6A, there is shown a flow of fluid through the filtered device 10 when the sliding-filter medium 22 becomes clogged or otherwise substantially obstructed. In this embodiment, the filtration-flow of unfiltered fluid 24b enters the filter device 10 through the cup port 18 and moves the sliding-filter medium 22 so as to sealingly engage the distal end portion 26 of the filter medium 22 with the cap portion 16. This fluid is directed through the second bi-directional valve 28' in a manner similar to the one detailed in the description for FIG. 4A. Thereafter, the fluid is directed through the first bi-directional valve 28 in a manner similar to the one detailed in the description for FIG. 4B.

Figure 6B:
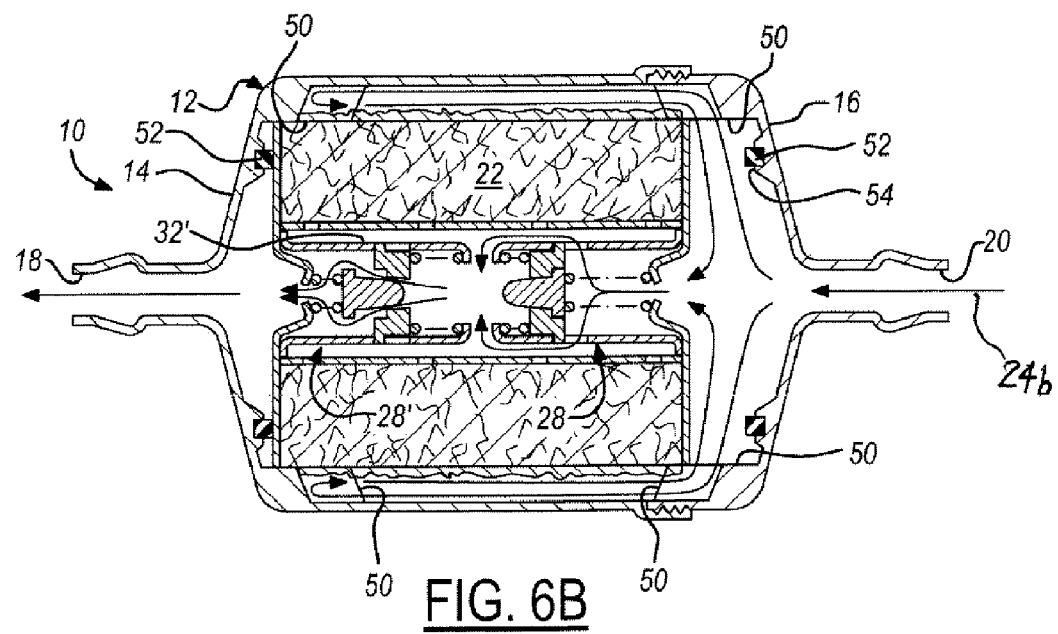
FIG. 6B is a cross-sectional view of the filter device shown in FIG. 6A, illustrating the bi-directional valves allowing fluid to bypass the clogged filter medium in the second direction of fluid flow.

With reference to FIG. 6B, the filter device 10 can also allow fluid to bypass the sliding-filter medium 22 when the fluid flows through the device 10 in the opposite direction. It will be appreciated that the sliding-filter medium 22 and the bi-directional valves 28, 28' can be utilized in a manner similar to the one detailed in the description for FIG. 6A.

Figure 9A:
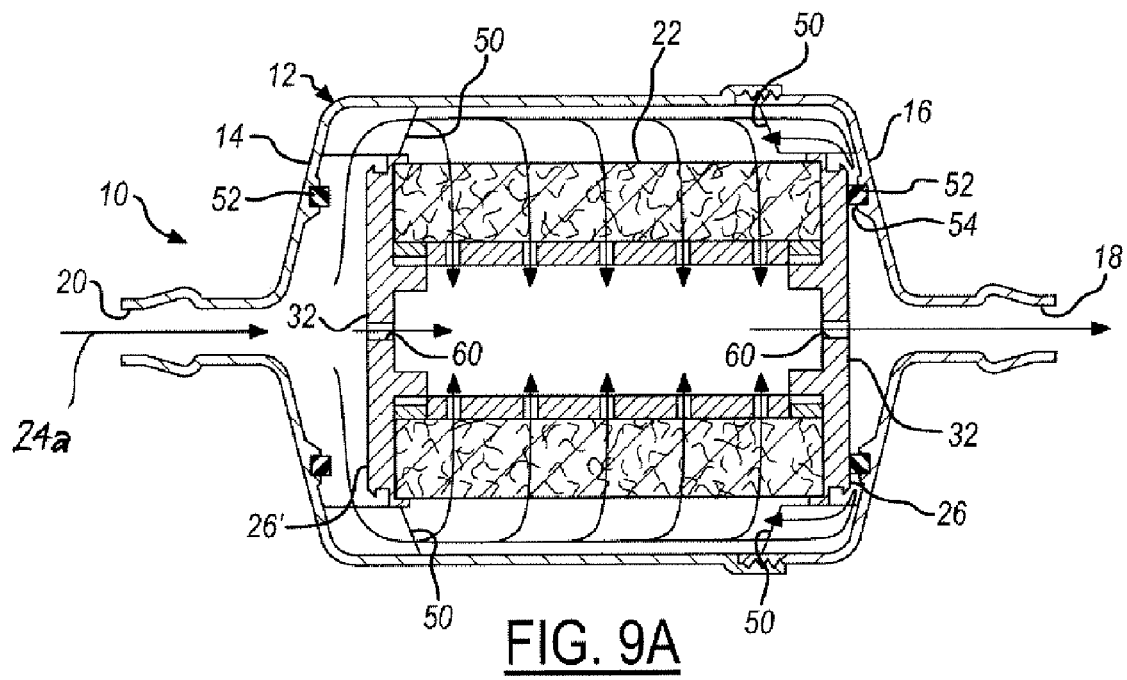
FIG. 9A is a cross-sectional view of the filter device shown in FIG. 5A, illustrating a sliding-filter medium for filtering fluid that flows in a first direction, according to yet another advantageous embodiment of the invention.
Figure 9B:
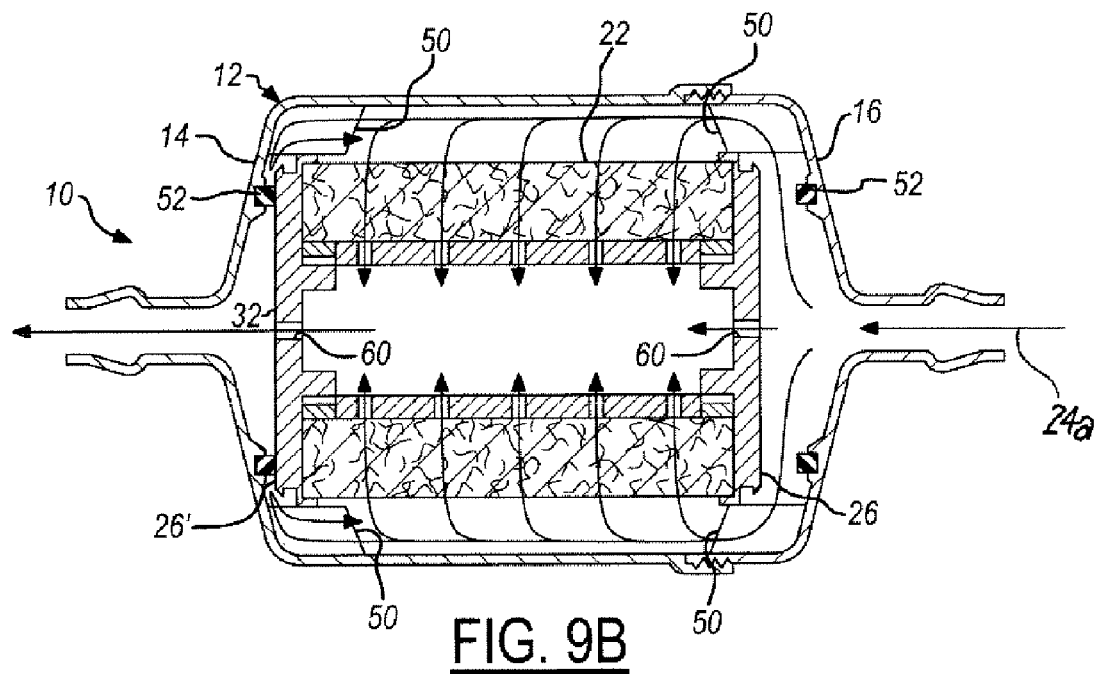
FIG. 9B is a cross-sectional view of the filter device shown in FIG. 9A, illustrating the sliding-filter medium filtering fluid that flows in a second direction opposite to the first direction.

Referring now to FIGS. 9A and 9B, there is shown the filter device 10 illustrated in FIG. 1 according to yet another advantageous embodiment of the invention. This filter device 10 also includes a sliding-filter medium 22, which filters fluid regardless of the direction in which the fluid flows. In this embodiment, the bi-directional valves 28, 28' are comprised of two end plates 32 with orifices 60 formed therein. These orifices 60 are sized for passing fluid therethrough at a predetermined rate when a predetermined fluid pressure exists. The end plates 32 are coupled to the filter medium 22 by way of a center core portion 62 disposed in the center of the filter medium 22. The attachment between the end plates 32 and the center core portion 62 preferably is accomplished by a snap-fit engagement. However, it is understood that various other fastening methods can be utilized as desired.

While the invention has been described in terms of the above embodiments, it will be understood, of course, that the invention is not limited thereto since modifications may be made by those skilled in the art, particularly in light of the foregoing teachings. For instance, elements of the above embodiments can be combined together, omitted, or incorporated with various other suitable constructions as desired.

What is claimed is:

1. A fluid filter device providing at least three substantially continuous directions of flow therethrough, said fluid filter device comprising:
   a housing having an entry port and an exit port; a filter medium disposed within said housing for filtering a fluid flowing along a filtration-flow direction that extends from said entry port, through said filter medium, and to said exit port in said housing; and
   a single bi-directional valve assembly coupled to said filter medium for independently and selectively diverting said fluid under variable pressure along either a bypass-flow direction or a reverse-flow direction, wherein said bypass-flow direction extends from said entry port and to said exit port so as to bypass said filter medium, and said reverse-flow direction extends from said exit port and to said entry port;
   wherein said bi-directional valve assembly includes:
   (a) a substantially unitary mounting frame having a substantially plate-like portion and a substantially tubular portion, wherein said mounting frame is slidable and thus movable within said housing, and said tubular portion has at least one opening for passing said fluid therethrough along said bypass-flow direction;
   (b) a positionable plug member;
   (c) a primary biasing member predeterminately adapted for selectively positioning said plug member in said at least one opening of said tubular portion so as to selectively block said bypass-flow direction and thereby selectively direct said fluid along at least one of said filtration-flow direction and said reverse-flow direction; and
   (d) a secondary biasing member predeterminately adapted for selectively moving said plate-like portion of said mounting frame substantially against said filter medium so as to selectively and at least partially block said fluid from passing along said reverse-flow direction;
   wherein said filter medium is substantially fixed within said housing such that said filter medium remains substantially stationary in said housing even as said mounting frame is selectively moved to various positions by said secondary biasing member.

2. A fluid filter device according to claim 1, wherein said primary biasing member has a predetermined coefficient of stiffness for alternatively directing said fluid, when under a predetermined pressure, along said bypass-flow direction.

3. A fluid filter device according to claim 1, wherein said secondary biasing member is coupled between said mounting frame and said housing.

4. A fluid filter device according to claim 1, wherein said secondary biasing member has a predetermined coefficient of stiffness for alternatively directing said fluid, when under a predetermined pressure, along said reverse-flow direction.

5. A fluid filter device according to claim 1, wherein said filter medium includes a first distal end portion and a second distal end portion that is opposite to said first distal end portion, said first distal end portion is sealingly coupled to said housing, and said second distal end portion is coupled to said bi-directional valve assembly.

6. A fluid filter device according to claim 1, wherein said entry port and said exit pod are substantially defined through opposite ends of said housing, said filter medium is substantially fixed within said housing between said entry pod and said exit port, said filter medium has a first distal end portion sealingly coupled to the inside of said housing about said exit port, and said filter medium has an opposite second distal end portion coupled to said bi-directional valve assembly such that said bi-directional valve assembly is situated proximate to said entry port.

7. A filter device comprising:
a housing having an entry port and an exit port;
a filter medium within said housing; and
a single bi-directional valve assembly coupled to said filter medium for independently and selectively directing a fluid under variable pressure along at least one of a filtration-flow direction, a bypass-flow direction, and a reverse-flow direction via said housing;
wherein said bi-directional valve assembly includes:
(a) a substantially unitary mounting frame;
(b) a positionable plug member;
(c) a primary biasing member predeterminately adapted for selectively forcing said plug member substantially against said mounting frame so as to selectively block said bypass-flow direction and thereby selectively direct said fluid along at least one of said filtration-flow direction and said reverse-flow direction; and
(d) a secondary biasing member predeterminately adapted for selectively forcing said mounting frame sealingly against said filter medium so as to selectively and at least partially block said fluid from passing along said reverse-flow direction;
wherein said filter medium is substantially fixed within said housing such that said filter medium remains substantially stationary in said housing even as said mounting frame is selectively forced to move to various positions by said secondary biasing member.

8. A filter device according to claim 7, wherein said filtration-flow direction extends from said entry port, through said filter medium, and to said exit pod so that said filter medium is able to filter said fluid.

9. A filter device according to claim 7, wherein said bypass-flow direction extends from said entry port and to said exit port so as to bypass said filter medium.

10. A filter device according to claim 7 wherein said reverse-flow direction extends from said exit port and to said entry port such that said reverse-flow direction is generally opposite to said bypass-flow direction.

11. A filter device according to claim 7, wherein said mounting frame has a substantially plate-like portion and a substantially tubular portion extending therefrom, said tubular portion has at least one opening therein, and said primary biasing member is utile for selectively positioning said plug member in said at least one opening of said tubular portion so as to selectively block said bypass-flow direction and thereby selectively direct said fluid along at least one of said filtration-flow direction and said reverse-flow direction.

12. A filter device according to claim 7, wherein said secondary biasing member is coupled between said mounting frame and said housing.

13. A filter device according to claim 7, wherein said filter medium includes a first distal end portion and a second distal end portion that is opposite to said first distal end portion, said first distal end portion is sealingly coupled to said housing, and said second distal end portion is coupled to said bi-directional valve assembly.

14. A filter device comprising:
a housing having at least two ports for passing a fluid;
a filter medium within said housing; and
a single hi-directional valve assembly coupled to said filter medium for independently and selectively directing said fluid under variable pressure along at least one of a filtration-flow direction, a bypass-flow direction, and a reverse-flow direction through said housing;
wherein said bi-directional valve assembly includes:
(a) a mounting frame;
(b) a positionable plug member;
(c) a primary biasing member predeterminately adapted for selectively forcing said plug member substantially against said mounting frame so as to selectively block said bypass-flow direction and thereby selectively direct said fluid along at least one of said filtration-flow direction and said reverse-flow direction; and
(d) a secondary biasing member predeterminately adapted for selectively forcing said mounting frame sealingly against said filter medium so as to selectively and at least partially block said fluid from passing along said reverse-flow direction;
wherein said filter medium is substantially fixed within said housing such that said filter medium remains substantially stationary in said housing even as said mounting frame is selectively forced to move to various positions by said secondary biasing member.

15. A filter device according to claim 14, wherein said primary biasing member has a predetermined coefficient of stiffness for alternatively directing said fluid, when under a predetermined pressure, along said bypass-flow direction.

16. A filter device according to claim 14, wherein said secondary biasing member is coupled between said mounting frame and said housing.

17. A filter device according to claim 14, wherein said secondary biasing member has a predetermined coefficient of stiffness for alternatively directing said fluid, when under a predetermined pressure, along said reverse-flow direction.

18. A fluid filter device according to claim 1, wherein said reverse-flow direction extends from said exit port and to said entry port so as to substantially bypass said filter medium.

19. A filter device according to claim 7, wherein said mounting frame of said bi-directional valve assembly is slidable within said housing.

* * * * *